United States Patent
Mohanty

(10) Patent No.: US 9,692,778 B1
(45) Date of Patent: Jun. 27, 2017

(54) METHOD AND SYSTEM TO PRIORITIZE VULNERABILITIES BASED ON CONTEXTUAL CORRELATION

(71) Applicant: Symantec Corporation, Mountain View, CA (US)

(72) Inventor: Shubhabrata Mohanty, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/538,599

(22) Filed: Nov. 11, 2014

(51) Int. Cl.
*H04L 29/06* (2006.01)
*G06F 9/455* (2006.01)

(52) U.S. Cl.
CPC ...... *H04L 63/1433* (2013.01); *G06F 9/45533* (2013.01)

(58) Field of Classification Search
CPC .............. H04L 63/1433; G06F 9/45533
See application file for complete search history.

(56) References Cited

U.S. PATENT DOCUMENTS

| | | | | |
|---|---|---|---|---|
| 2009/0077666 A1* | 3/2009 | Chen | ............ | G06F 21/577 726/25 |
| 2013/0191919 A1* | 7/2013 | Basavapatna | ......... | G06F 21/577 726/25 |
| 2014/0201836 A1* | 7/2014 | Amsler | ............ | H04L 63/20 726/23 |
| 2014/0223555 A1* | 8/2014 | Sanz Hernando | ...... | G06F 21/55 726/22 |
| 2015/0040228 A1* | 2/2015 | Lee | ............ | H04L 63/1433 726/25 |

OTHER PUBLICATIONS

Mell et al., (The Common Vulnerability Scoring System (CVSS) and Its Applicability to Federal Agency Systems, NIST Interagency Report 7435, Aug. 2007, 33 pages).*
Quinn et al. "Guide to Adopting and Using the Security Content Automation Protocol (SCAP) Version 1.0", NIST Special Publication 800-117, Jul. 2010, 26 pages.*

* cited by examiner

*Primary Examiner* — Saleh Najjar
*Assistant Examiner* — Oleg Korsak
(74) *Attorney, Agent, or Firm* — Maschoff Brennan

(57) ABSTRACT

A method for prioritizing vulnerabilities of an asset in a virtual computing environment is provided. The method includes determining a vulnerability score for the asset, based on at least one of a base vulnerability score or a temporal vulnerability score and receiving information about a threat. The method includes correlating the information about the threat with information about the open vulnerabilities on the asset and also about the asset to determine a threat score for the asset and determining a contextual score for the asset based on at least one tag of the asset. The method includes deriving a prioritization score for the asset, the prioritization score a combination of the vulnerability score, the threat score and the contextual score, wherein at least one method action is performed by a processor.

20 Claims, 5 Drawing Sheets

METHOD AND SYSTEM TO PRIORITIZE VULNERABILITIES BASED ON CONTEXTUAL CORRELATION

BACKGROUND

Virtualization has redefined how IT ops (information technology operations) build and deliver assets in a virtualized environment, where virtual machines or virtual applications (apps) go online or offline, or change zones dynamically within minutes or hours. Traditional Vulnerability Assessment (VA) products which scan machines to report vulnerabilities have difficulties in a virtualized environment. A snapshot of a vulnerability assessment report of a system provided in the past becomes obsolete within hours or minutes as virtual machines or workloads change positions within a virtualized environment. Consequently, in virtualized environments, any risks, threat exposures or known vulnerabilities are constantly changing. A security operations team needs a strong and continuous prioritization system to track critical vulnerabilities and take actions as changes occur.

Vulnerability assessment products scan systems on demand and report a list of known vulnerabilities in the form of a CVSS (common vulnerability scoring system) score. With workloads constantly changing their positions, the same set of vulnerabilities changes the exploitability surface as well. The challenges presented include how to interpret hundreds of vulnerabilities reported by these VA products and how to identify specific vulnerabilities that truly represent a clear and present risk to security. The CVSS score (as either a Base CVSS score or a Temporal CVSS score) does not consider the environment-specific characteristics of the customer or the workload distribution and the threats that can exploit them based on the positioning of the workload. The CVSS Base or Temporal score only contains a CIA (confidentiality, integrity, availability) score and access vectors to derive the importance of the information, but is not sufficient in a dynamic environment such as in virtualization space. A CVSS score alone does not necessarily provide sufficient information for effective remediation prioritization.

It is within this context that the embodiments arise.

SUMMARY

In some embodiments, a method for prioritizing vulnerabilities of an asset in a virtual computing environment is provided. The method includes determining a vulnerability prioritization score for the asset, based on at least one of a base vulnerability score or a temporal vulnerability score, deriving virtual workload context and receiving information about a threat. The method includes correlating the information about the threat with information about the asset to determine a threat score for the asset and determining a contextual score for the asset based on virtual workload context in turn is based on multiple tags of the asset as provided by virtualization ecosystem like VMware, AWS, etc. The method includes deriving a prioritization score for the asset, the prioritization score a combination of the vulnerability score, the threat score and the contextual score, wherein at least one method action is performed by a processor.

In some embodiments, a tangible, non-transitory, computer-readable media having instructions thereupon which, when executed by a processor, cause the processor to perform a method. The method includes obtaining one of a base common vulnerability scoring system (CVSS) score or a temporal common vulnerability scoring system score, concerning an asset in a virtual computing environment, receiving threat information, and generating a threat score for the asset, based on applicability of the threat information to the asset. The method includes generating a contextual score for the asset, based on information on at least one dynamic or static tag of the asset from virtualization ecosystem and generating a prioritization score for the asset, based on a multiplication of the contextual score, the threat score and the one of the base common vulnerability scoring system score or the temporal common vulnerability scoring system score.

In some embodiments, a system for prioritizing vulnerabilities of an asset in a virtual computing environment. The system includes a vulnerability assessment module that obtains a vulnerability score for the asset and a threat intelligence system that provides a list of vulnerabilities it can exploit, generates a threat score assessing vulnerability of the asset to a threat, based on threat information and based on information about the asset from at least one tag of the asset received from virtualization ecosystem platform. The system includes a contextual module that generates a contextual score based on workload context of the asset relative to static aspects of the asset from the at least one tag and dynamic aspects of the asset from the at least one tag or security events and a prioritization module that multiplies together the threat score, the contextual score and the vulnerability score to generate a prioritization score for the asset. The system includes a processor coupled to the vulnerability module, the threat module, the contextual module and the prioritization module.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
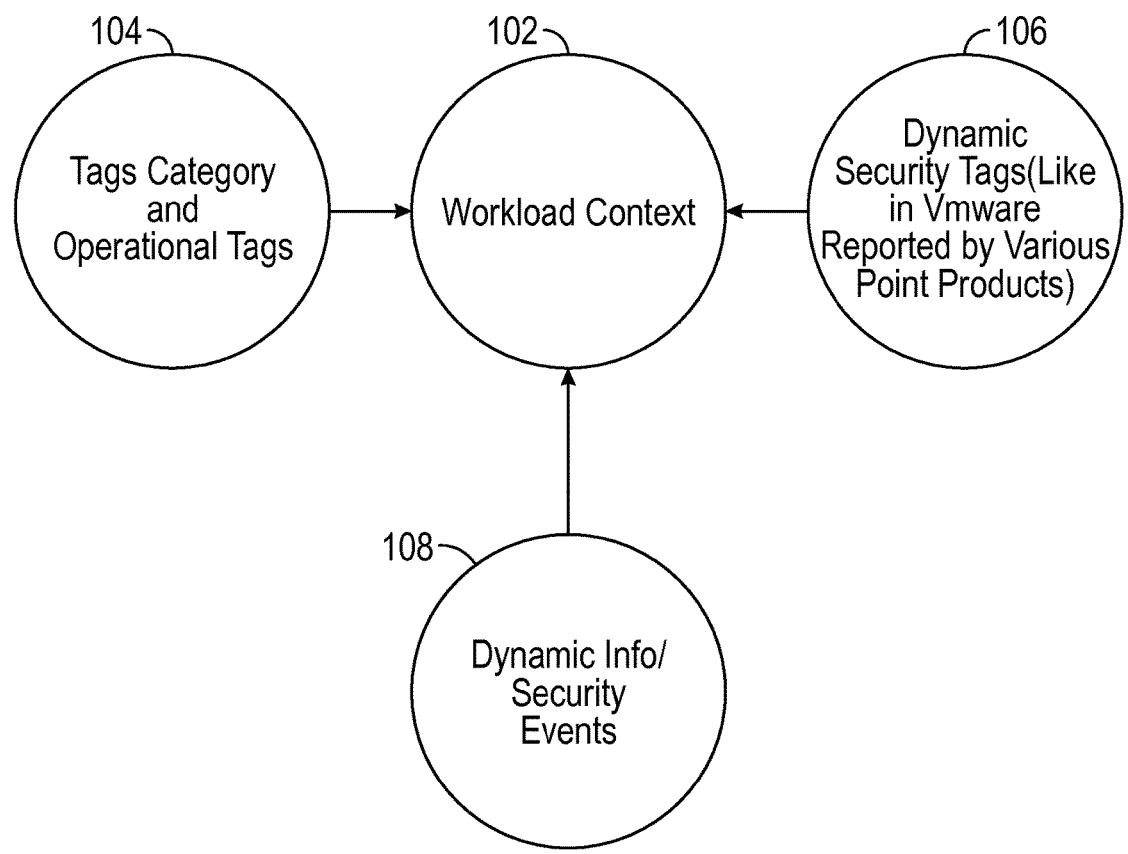
FIG. 1 is a schematic diagram illustrating the workload context of an asset in a virtual environment in some embodiments.

A contextual prioritization system and a related method of prioritizing vulnerabilities of an asset in a virtual environment produce a prioritization score for the asset, relating to vulnerabilities, threats and a workload context of the asset. By correlating and combining threat information, vulnerability data and workload context, and rapidly updating the prioritization score that results from such analysis, the disclosed system and method provide information that is more context-based than the CVSS (common vulnerability scoring system) score.

Adding dynamic context about which vulnerabilities are being exploited using known exploits, and relating this to environmental characteristics of an asset, provides an improved mechanism of determining whether or not a given virtual machine or virtual application is at high risk from an attack perspective. Considering only a CVSS score reported by a VA (vulnerability assessment) product could be misleading or insufficient, as the CVSS score does not consider factors of the asset environment that drive the criticality or risk exposure of the asset. For example, a possible high CVSS score could be indicated for an asset that has a low risk of being exploited in some instances. Meanwhile, an asset with a high vulnerability but a low CVSS score may still be attacked depending upon other environmental factors in the asset environment such as threats associated with the vulnerability, probability of attack based on workload or VM (virtual machine) positioning, compensating controls or primary controls present in the asset environment, etc.

Security Operations (also referred to as Sec Ops) teams need solutions that help them distinguish the critical vulnerabilities from the noise or false-positives. For example, a mission critical Internet Banking web server may have multiple known vulnerabilities, but which of those present genuine risk to the organization may be unknown. Various embodiments of a system and method described below identify assets as to criticality of vulnerability, thereby lowering incidence of false positives and increasing awareness of assets that are critical, which may require immediate attention of a security operations team. This solves a critical problem in virtualization space, by identifying, correlating, calculating and determining the prioritization of vulnerabilities that pose serious risk to an organization that has operating assets in a virtualized environment.

The system and method employ an algorithm that correlates vulnerabilities with contextual information such as threat data and virtualization tags (e.g., as provided in the virtualization environment by a vendor such as VMware, etc). The algorithm works on a three dimensional (or three axis) model in some embodiments. The three dimensions are summarized below:

Dimension#1—Vulnerability (e.g., as reported by vulnerability assessment products). Related data could include base/temporal CVSS score, common vulnerabilities and exposures identifier (CVE ID), severity, etc.
  Dimension#2—Threat (e.g., threats received from Threat Intelligence systems such as DeepSight). Related data could include threat impact, impacted CVE ID, type of threat, operating system impacted, applications impacted, etc.
  Dimension#3—Workload Context: Tags (e.g., Operational Tags as well as Security Tags, i.e., static tags and dynamic tags, as defined in a virtualization environment using VMware, etc.) Related data could include whether an asset is external facing, Web-connected, has sensitive data, location, etc. Dynamic security events like data loss incidents, any possible attacks, etc., could be added to derive more accurate workload context.

FIG. 1 is a schematic diagram of the workload context 102 of an asset in a virtual environment. Insights into various aspects of the workload context 102 provide guidance into operation of the system and method. When an asset (e.g., a virtual machine or a virtual application) is created and deployed in a virtual environment, information about the asset can be written as metadata to one or more tags (see FIGS. 2 and 3). Further information can be written to tags as situations occur. Static tags 104 have information about tag categories, i.e., each tag category could have one or more tags as information about the asset. These static tags 104 could also be referred to as operational tags, in that the static tag 104 specifies aspects of the operation of the asset. Static tag information affects the workload context 102 of the asset. Dynamic tags 106 have information that is subject to change during the lifespan of the asset. Dynamic tags 106 can also be referred to as security tags, since the changing information is of interest regarding security of the asset. Dynamic tag information affects the workload context 102 of the asset. Dynamic information and security events 108 affect the workload context 102, particularly as to vulnerability of the asset. Some of the dynamic information and security events can be written to the dynamic tags 106.

Figure 2:
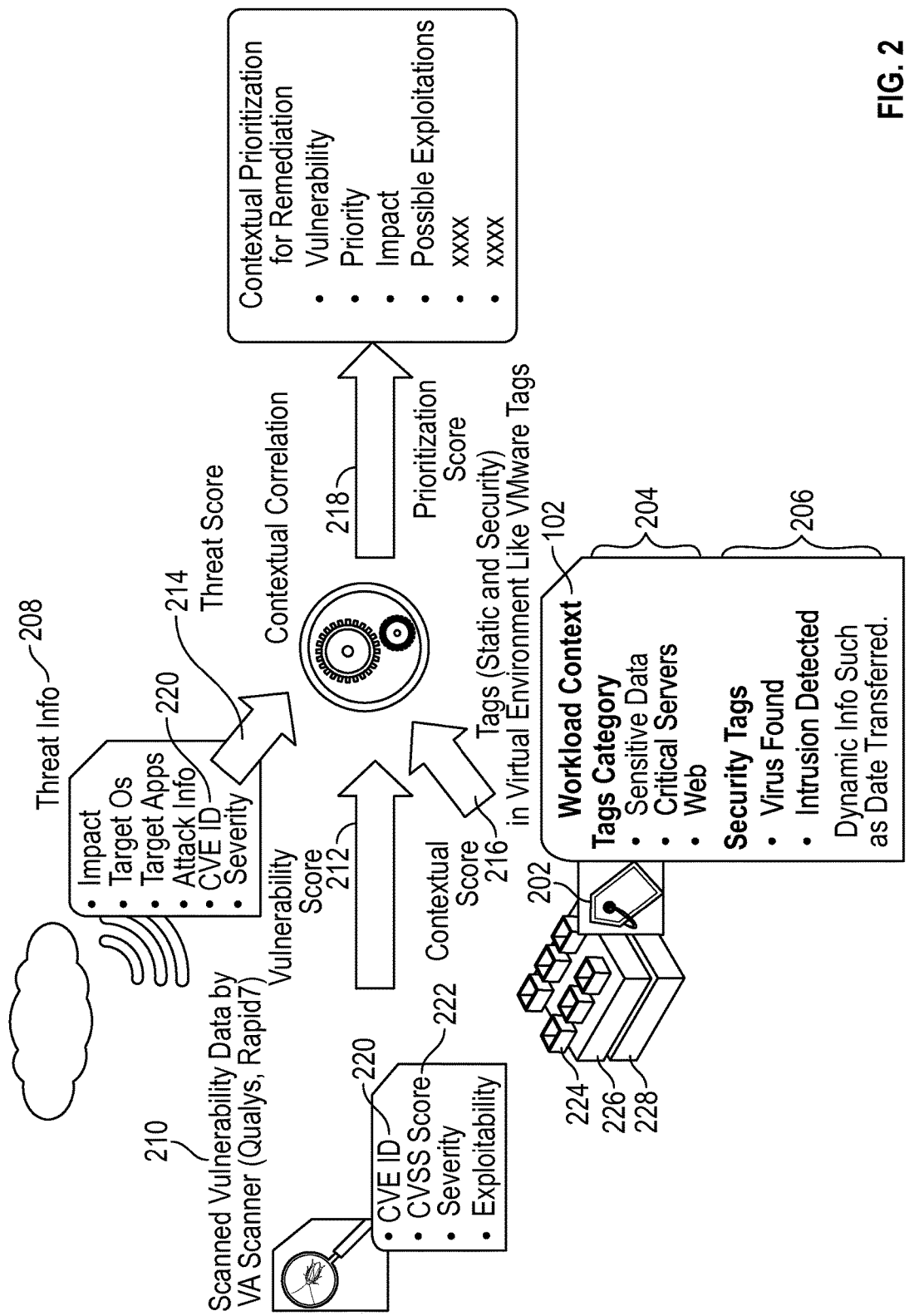
FIG. 2 is a schematic diagram, showing how threat information, scanned vulnerability data and tag information for the asset are combined into a contextual correlation, so that a prioritization score is produced in some embodiments.

FIG. 2 is a schematic diagram, showing how threat information 208, scanned vulnerability data 210 and workload context as tags, information 204, 206 for the asset 224 are combined into a contextual correlation, so that a prioritization score 218 is produced in some embodiments. Threat information 208 comes from one or more threat intelligence systems (see FIG. 3). Vulnerability data 210 comes from one or more scanners (see FIG. 3). Tag information 204, 206 comes from one or more tags 202 in the virtualization ecosystem like VMware of the asset 224. Threat intelligence systems such as DEEPSIGHT provide threat information 208 about external threats. The embodiments of the system and method described herein correlate vulnerabilities with emerging threats to derive threat exposure, the risk the vulnerability poses, and the importance of remediating such risk. Threats play an important role in deriving the exploitability characteristics of a vulnerability depending on the asset environment. For example, a vulnerability found on a web server facing to internet with a CVSS score of "10" may have a serious impact if exposed to an external threat, as compared to the same vulnerability existing on a web server that is sitting in a LAN (local area network) with an exposure to the same threat but with a low impact. Threat information 208 reported by systems such as DEEPSIGHT or other systems may include a common vulnerabilities and exposures identifier (CVE ID) 220 that identifies a specific vulnerability and/or a specific exposure that a particular threat exploits, the operating system (OS) targeted by a particular threat, the threat impact, a specific threat type (e.g., the threat is associated with the Web or a specified network), a specific application that the threat targets, attack information, severity of the threat, etc. This threat information 208 can be used to correlate with vulnerability data 210 and workload context as tags information 204, 206 from tags 202 to derive the magnitude of the threat and attack surface.

Still referring to FIG. 2, VA products known as scanners scan virtual machines and report vulnerabilities with additional information such as Severity, Base CVSS Score 222, Temporal CVSS Score 222, and CVE ID 220. The vulnerability data 210 provided by such a scanner applies to a particular asset 224 being scanned.1 The CVSS score 222, which can include a base score and a temporal score, may be resolved or analyzed into metrics and vectors, and the vulnerability score 212 can be based on the CVSS score 222 in various ways. For example, the vulnerability score 212 can apply just the base CVSS score 222, just the temporal CVSS score 222, or a combination of these two scores, or otherwise be derived from one, the other, or both of the scores. Whenever a CVE ID 220, operating system, associated applications like ACROBAT, CHROME, etc. identifying a vulnerability or exposure of the asset 224, is provided in the vulnerability data 210 from a scanner, the disclosed system and method can use this information to correlate with a CVE ID 220 provided in the threat information 208, or operating system, impacted applications, etc. in production of a threat score 214. Vulnerability data 210 can also include information about severity of a particular vulnerability or exposure, and information about the exploitability of a particular vulnerability or exposure.

Continuing with FIG. 2, workload context 102 is represented in and derived from various tags 202. In some embodiments, the workload context 102 represents answers to some of the following questions:

How business critical are the virtual machines where vulnerabilities are found?

What is the criticality of the business unit that owns this workload, such as Legal, Internal IT, Customer facing, etc.?

Where is the workload/virtual machine positioned in the network, and how does it influence the exposure?

Is the workload in an Intranet, the Internet or a local area network?

Do the virtual machines/workloads contain sensitive data?

What data does an attacker gain access to when a vulnerability is exploited?

What is the impact if an exploitation occurs?

Answers to the above questions can be defined as characteristics and written to tags 202 of assets 224. Generally, there are two manners in which tags 202 can be defined, although further types of tags and tagging strategies are readily devised, consistent with the teachings herein. A first mechanism is to mark a virtual machine with a set of tags 202 such as CRITICAL DATA, WEB, INTERNET FACING, ADOBE_APP, INTERNET_EXPLORER_APP, etc. These are known as Static Tags, and have static tag information 204. A second mechanism is to mark a virtual machine with a set of dynamic tags 202 such as VIRUS FOUND, INTRUSION DETECTED, etc., by security technologies monitoring the same systems. These are known as dynamic tags or security tags, and have dynamic security related information 206. Thus, the above questions or characteristics of a virtual machine or virtual application can be defined by both static as well as dynamic tags. For example, static tag information 204 could include indication of whether there is sensitive data in or handled by the asset 224, whether the asset 224 includes one or more critical servers, and whether the asset is Web-connected. Dynamic tag information 206 could include whether or not a virus has been found in the asset 224, whether or not an intrusion has been detected in the asset 224, and/or whether or not suspicious data has been transferred into or out of the asset 224.

The method and system of the embodiments leverage threat attributes such as OS supported, threat impact, impacted CVE ID, type (Web/Network), etc. and virtualization tags 202 such as EXTERNAL FACING, WEB, CRITICAL DATA, LOCATION, etc. to correlate with the CVE ID 220 of vulnerabilities reported by VA products. Since the method and system use environment specific details with a threat feed (i.e., a supplier of threat information 208), the derived prioritization is more accurate and meaningful than just the CVSS score 222 and the CVE ID 220. A vulnerability score 212, a threat score 214, and a contextual score 216 are combined to form a prioritization score 218. The prioritization score 218 can be applied to indicate the impact or severity of vulnerability, so that vulnerabilities can be prioritized as to which ones need attention or remediation. Below are the various scores 212, 214, 216, 218 and how they are calculated, in some embodiments. It should be appreciated that various further scales and various further calculations are readily devised in accordance with the teachings herein.

Vulnerability Score 212 represents CVSS Score 222 (Base or Temporal as reported by VA products), e.g., as associated or correlated with a particular vulnerability or exposure which may be accompanied by a CVE ID 220. This score is expressed on a scale of 1-10, or 0-10, in some embodiments. Threat Score 214 represents threats correlated with vulnerabilities based on Threat Impact, OS Supported, Threat Type, etc. A score is derived in a scale of 1-10, in some embodiments. Contextual Score 216 represents Tags 202 (both Static and Dynamic Tags) correlated with Threats and Vulnerabilities. A score is derived in a scale of 1-10, in some embodiments. Prioritization Score 218 equals (Vulnerability Score 212×Threat Score 214×Contextual Score 216)/100. This is for a particular vulnerability or exposure, which is now prioritized.

Continuing with FIG. 2, the prioritization score 218 is proportional to the product of the vulnerability score 212, the threat score 214, and the contextual score 216, with or without various scaling factors in some embodiments. In further embodiments, the prioritization score 218 is a combination of the vulnerability score 212, the threat score 214, and the contextual score 216. For example, the prioritization score 218 could be a vector with each of the vulnerability score 212, the threat score 214, and the contextual score 216 expressed as a length along one of a number of mutually orthogonal axes, or the prioritization score 218 could be the magnitude of such a vector (i.e., the prioritization score 218 is equal to the square root of the sum of the squares of each of the vulnerability score 212, the threat score 214, and the contextual score 216, with or without scaling), etc. Further combinations of the vulnerability score 212, the threat score 214, and the contextual score 216, with or without scaling, to form a prioritization score 218 are readily envisioned.

Figure 3:
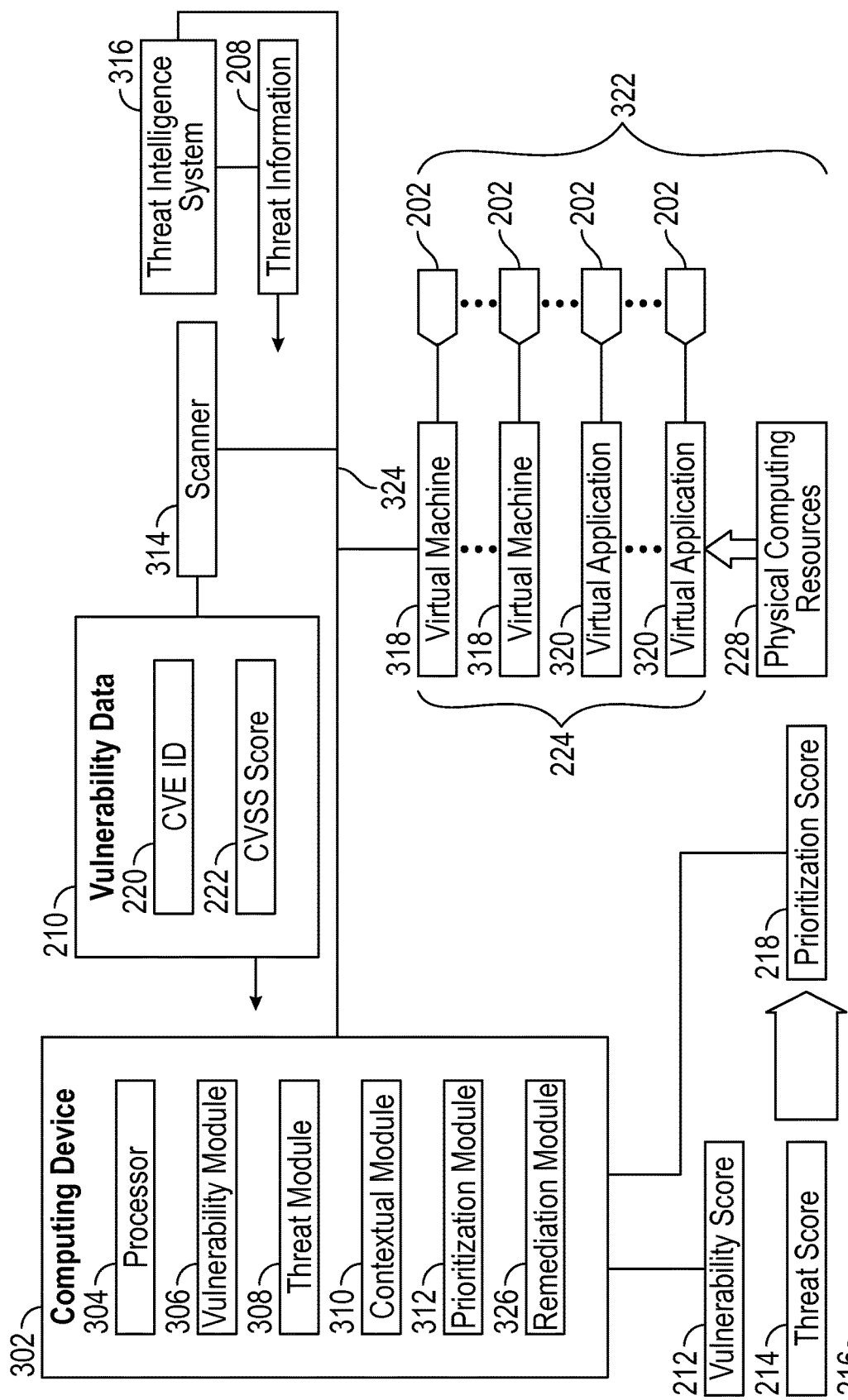
FIG. 3 is a system diagram of a contextual prioritization system that prioritizes vulnerabilities of the asset, based on contextual correlation in accordance with the concept diagrams of FIGS. 1 and 2 in some embodiments.

FIG. 3 is a system diagram of a contextual prioritization system that prioritizes vulnerabilities of the asset 224, based on contextual correlation in accordance with the concept diagrams of FIGS. 1 and 2. Virtual machines 318 and/or virtual applications 320 are implemented using physical computing resources 228, in a virtual computing environment 322. The asset 224 under consideration for prioritization of vulnerabilities could be one or more virtual machines 318 and/or one or more virtual applications 320, and various combinations thereof. A scanner 314, for example a VA scanner by QUALYS or RAPID7, performs vulnerability checks (i.e., scans) on the virtual machines 318 and the virtual applications 320, and reports vulnerability data 210, including a CVSS score 222. This may be accompanied by a CVE ID 220, which identifies a specific vulnerability or exposure, and which is now associated with the CVSS score 222 for a specific asset 224. The scanner 314 can be coupled to the virtual machines 318 and the virtual applications 320 by a network 324 in some embodiments.

Still referring to FIG. 3, a threat intelligence system 316, for example DEEPSIGHT, reports latest list of threats in a wild 208. When reporting a specific threat, the threat information 208 may also identify a target operating system, a target application, and a exploitable vulnerability or exposure as specified by a CVE ID 220. The threat information 208 could also include attack information, severity information and information on other aspects of the threat in some embodiments. Vulnerability data 210 and threat information 208 are received by a computing device 302, which has a processor 304, a vulnerability module 306, a threat module 308, a contextual module 310 and a prioritization module 312. Each of these modules 306, 308, 310, 312 could be implemented in software executing on the processor 304, hardware, firmware, or combinations thereof. In some embodiments, two or more of the modules 306, 308, 310, 312 are combined.

The vulnerability module 306 of FIG. 3 tracks specific vulnerabilities for each asset 224, for example by establishing a data structure in memory and populating the data structure with information about each vulnerability relative to each asset 224. When vulnerability data 210 is received by the computing device 302, the vulnerability module 306 tracks the association of CVE ID 220, CVSS score 222, severity and exploitability information (when available) for each such vulnerability or exposure, for each asset 224, so that these are correlated. For example, various associated entries could have links in a database, be on the same row or column in a table, or be listed sequentially in a file, etc. The vulnerability module 306 produces a vulnerability score 212, for each vulnerability for each asset 224, which could be the base CVSS score 222 or the temporal CVSS score 222 or a combination thereof.

The threat module 308 of FIG. 3 tracks specific threats, for example by establishing a data structure in memory and populating the data structure with information about each threat reported in the threat information 208. When the threat information 208 is received by the computing device 302, the threat module 308 tracks the association of each specific threat, the operating system targeted by the threat, the application(s) targeted by the threat, attack information, specifically identified exploitable vulnerabilities or exposures accompanied by a CVE ID 220, and severity information about the threat (when available), so that these are correlated. For each asset 224, the threat module 308 cooperates with the vulnerability module 306 to determine which vulnerabilities, e.g., as identified by a CVE ID 220, are associated with the asset 224. This correlation leads the threat module 308 to determine which specific threats, as associated with the CVE ID 220, are applicable to the asset 224 and therefore should be associated with the asset 224. In other words, the threat module 308 correlates the asset 224, the CVE ID 220, and the threat or threats. Now that the threat module 308 has determined which specific threat or threats should be associated with the asset 224 and the vulnerability or vulnerabilities thereof, the threat module 308 can correlate associated threat information 208, concerning this threat or threats, and characteristics of the asset 224. These characteristics can be determined from the tags 202. Based on this correlation, the threat module 308 produces a threat score 214 for the asset 224, relative to the vulnerability under consideration.

For example, consider a threat that the threat module 308 of FIG. 3 has determined is relevant for an asset 224, since the vulnerability module 306 has determined that a CVE ID 220 applies to the asset 224, and the threat under consideration is associated with that CVE ID 220 by the threat module 308. The threat information 208 indicates a target operating system and/or one or more target applications. The threat module 308 can then determine whether that target operating system or that target application is indicated by one or more tags 202 as applicable to the asset 224. If the asset 224 has that target operating system and/or that target application, the threat module 308 would then produce a higher threat score 214 associated with the asset 224, the CVE ID 220, and the threat under consideration. The threat module 308 could determine whether the threat has an impact on the asset 224, whether the asset 224 has an operating system targeted by the threat, whether the asset 224 has an application targeted by the threat, whether the asset has a vulnerability associated with a common vulnerabilities and exposures identifier (i.e., CVE ID 220) that is associated with the threat, or severity of impact the threat poses to the asset 224. This information is applied to the generation of the threat score 214. The threat score 214 could be relative to a single identified threat, or could be a score that combines possibilities relative to multiple threats, as relevant to a specific vulnerability and a specific asset 224.

The contextual module 310 tracks the workload context 102 of each of the assets 224, for example by establishing a data structure in memory and populating the data structure with information derived from the tags 202. Static tag information 204 and dynamic tag information 206 may be included in the workload context 102. In some embodiments, each tag will have a Priority/Criticality attribute that determines how critical that tag is. Based on the Criticality Rating of a tag, a correlated Workload Context may have a higher score in some embodiments. For each asset 224, and for each vulnerability considered by the vulnerability module 306, the contextual module 310 generates a contextual score 216. To generate the contextual score 216, the contextual module 310 correlates aspects of the specified vulnerability, e.g., from vulnerability data 210, and aspects of the asset 224, e.g., from metadata in tags 202. In some embodiments, for a specified asset 224 and a vulnerability specified by a CVE ID 220, the contextual module 310 determines whether the vulnerability matches the asset 224. Consider a vulnerability to data access, as an aspect of a vulnerability specified by a CVE ID 220, and an asset 224 that handles sensitive data. This would be a strong match or correlation, and would generate a higher contextual score 216. A vulnerability to data access, and an asset 224 that does not have sensitive data, would generate a lower contextual score 216. A vulnerability to crashing a system, and an asset that has a critical server, would generate a higher contextual score 216 than would be the case for an asset that does not have a critical server. A vulnerability that relies on access via the Web, and an asset that has Web-connectivity, would generate a higher contextual score 216 than would be the case for an asset that does not have Web-connectivity. Certain types of dynamic tag information 206, such as virus found or intrusion detected, could produce a high contextual score 216 in and of themselves, and would produce an even higher contextual score 216 when correlated with certain types of vulnerabilities, such as vulnerabilities that rely on insertion of a virus or repeated intrusions. In some embodiments, threat information 208 is correlated with information from tags 202, in production of the contextual score 216. Further correlations of this nature are readily understood.

The prioritization module 312 of FIG. 3 cooperates with the vulnerability module 306, the threat module 308 and the contextual module 310, to produce the prioritization score 218 from the vulnerability score 212, the threat score 214 and the contextual score 216. In one embodiment, the prioritization module 312 multiplies the vulnerability score 212, for a particular asset 224 and a particular vulnerability (e.g., as identified by a CVE ID 220), the threat score 214, for the asset 224 and the particular vulnerability, and the contextual score 216, for the asset 224 and the particular vulnerability. This result can then be scaled, e.g., by dividing by a predetermined number, to produce the prioritization score 218. Various scales are readily devised for each of the scores 212, 214, 216, 218, as are various scaling factors. The prioritization score 218 thus represents a relative numbering or ranking of priority of a specific vulnerability of a specific asset 224, relative to other vulnerabilities and/or other assets 224.

A relatively high prioritization score 218 suggests the vulnerability in the asset 224 should be addressed by remediation. Vulnerability data 210 and/or threat information 208 can be consulted to guide the remediation effort. In some embodiments, a remediation module 326 performs such analysis, and generates a remediation recommendation. For example, a remediation module 326 could respond to a prioritization score 218 reaching a predetermined threshold, and produce a message, a report, an alert or a file, etc. This could be in various formats and include various types of information, such as indicating the correlation of the asset 224, the vulnerability (e.g., as identified by a CVE ID 220), one or more applicable threats, and relevant information from tags 202. Information technology personnel could then perform an appropriate remediation, based on this information.

Figure 4:
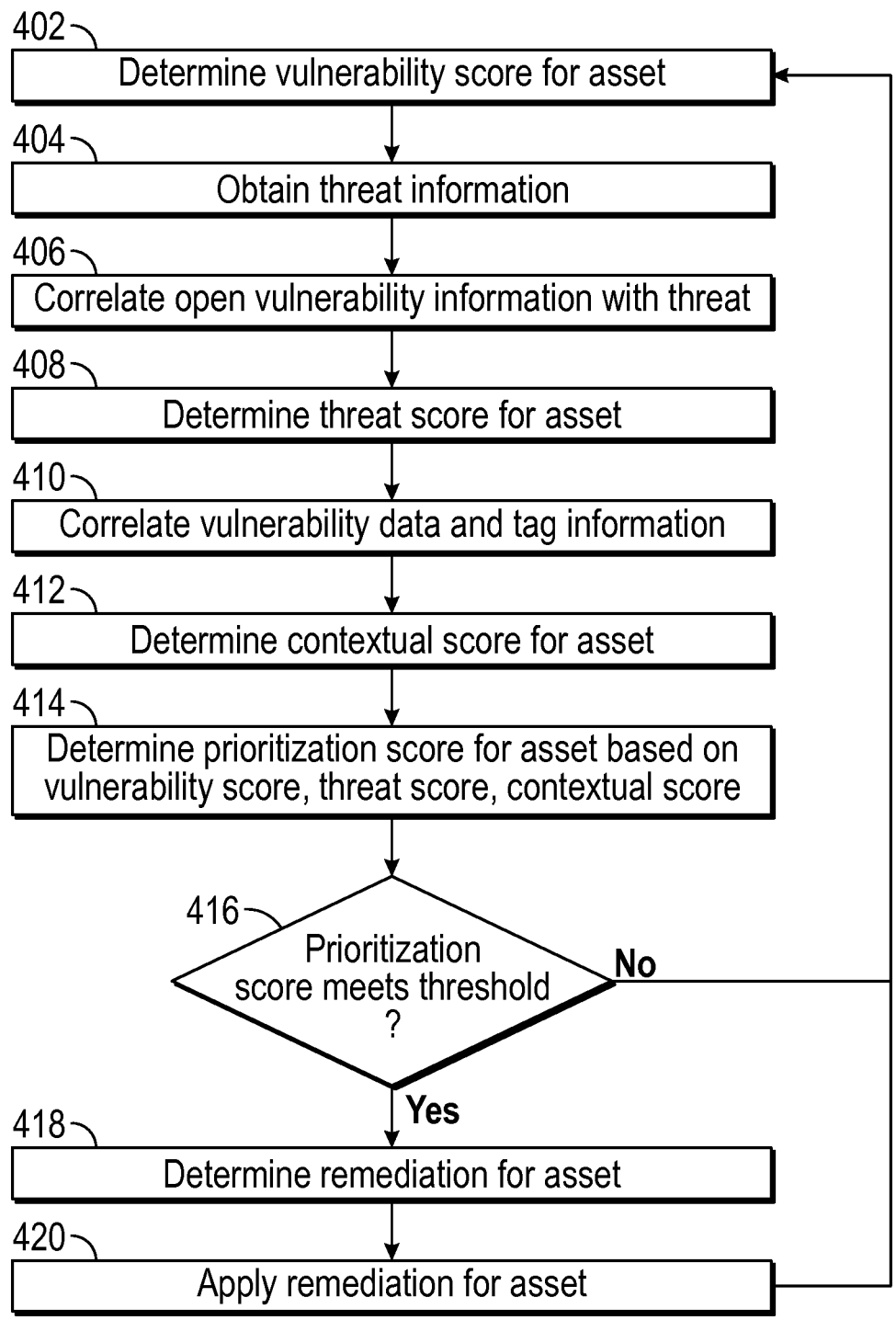
FIG. 4 is a flow diagram of a method of prioritizing vulnerabilities of an asset in a virtual environment in some embodiments.

FIG. 4 is a flow diagram of a method of prioritizing vulnerabilities of an asset in a virtual environment. The method can be practiced on or by embodiments of the system described with reference to FIGS. 1-3, such as the processor in FIG. 3. A vulnerability score is determined for an asset, in an action 402. The asset can include one or more virtual machines or virtual applications, as implemented using physical computing resources in a virtual computing environment. The vulnerability score could include, or be based on a base or temporal CVSS score, or both. This could be accompanied by a CVE ID, identifying a particular vulnerability in the asset for which the CVSS score is determined, and could be accompanied by further vulnerability data. The CVSS score could be determined by a scanner, as shown in FIG. 3, or could be determined locally to the asset or the processor. The vulnerability score could be determined by a vulnerability module, and relate to a particular vulnerability such as the vulnerability identified by the CVE ID. Threat information is obtained, in an action 404. The threat information could include identification of a particular threat, and identification of a vulnerability that the threat exploits, e.g. a CVE ID. The threat information could come from a threat intelligence system, as shown in FIG. 3.

Threat information and open vulnerability information are correlated, in an action 406 of FIG. 4. For example, the correlation could be performed by a threat module, using the threat information and information from one or more tags of the asset. The correlation could be performed relative to a particular vulnerability, e.g., the vulnerability identified by the CVE ID associated with the CVSS score to generate a vulnerability score correlating open vulnerabilities with threat information and provides a base score of those vulnerabilities impacted by threats in the wild. A threat score is determined for the asset, in an action 408. The threat score is formed by the threat module, and is based on the correlation performed in the action 406. The threat score correlates threat information with vulnerabilities and asset characteristics to get magnitude of impact of threat in terms of threat score. Vulnerability data and tag information are correlated, in an action 410. This correlation could be performed by a contextual module, in cooperation with the vulnerability module. For example, the correlation could determine whether aspects of vulnerability, associated with the CVE ID, match up with aspects of the asset, as determined from tags of the asset. A contextual score is determined for the asset, in an action 412. The contextual score is based on workload characteristics, information from the tags of the asset, and can be based further on correlation as performed in the action 410.

A prioritization score is determined for the asset, in an action 414 of FIG. 4. The prioritization score is based on the vulnerability score, the threat score and the contextual score. The vulnerability score, the threat score and the contextual score, and the prioritization score, are specific to the asset, and are specific to a particular vulnerability, e.g. the vulnerability identified by or associated with the CVSS score and/or the CVE ID, in various embodiments. The prioritization score provides a measure of a context-dependent vulnerability of an asset. In a decision action 416, it is determined whether the prioritization score meets a threshold. If the answer is no, the prioritization score does not yet meet a threshold, flow branches back to the action 402, in order to update the prioritization score. This action may be performed continuously, in a loop, on-demand, or responsive to changes to vulnerability data, threat information or workload context of the asset, in various embodiments. If the answer is yes, the prioritization score meets the threshold, flow proceeds to the action 418. In the action 418, a remediation for the asset is determined. The remediation should be based on the vulnerability for which the prioritization score is determined. Remediation is applied for the asset, in an action 420. For example, remediation could include updating or patching an operating system, applying a stronger encryption to sensitive data, investigating a data transfer, updating or upgrading equipment, etc.

Figure 5:
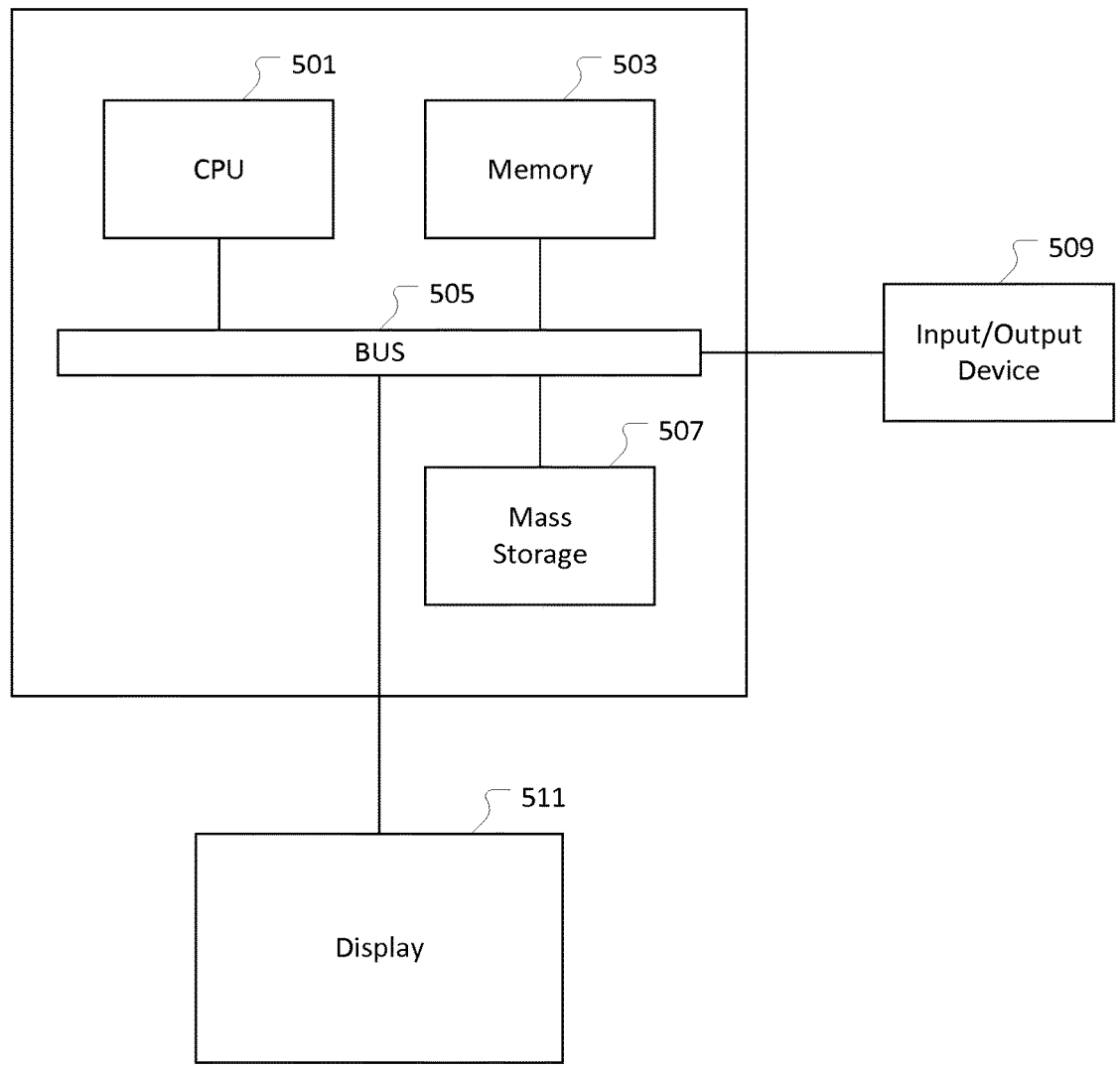
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for contextual prioritization of vulnerabilities of an asset in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS-WINDOWS™, UNIX™, LINUX™, iOS™ or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for prioritizing vulnerabilities of a specific asset deployed by an organization in a specific virtual computing environment, performed by a processor-based contextual vulnerabilities prioritization system, comprising:
   determining a vulnerability score for the specific asset, based on a CVSS (common vulnerability scoring system) score or other base vulnerability score or temporal vulnerability score, wherein the specific asset is a virtual machine or virtual application that is implemented using physical computing components in the specific virtual computing environment;
   receiving information about a threat;
   correlating the information about the threat with information about the specific asset based upon environmental factors of the specific asset to determine a threat score for the specific asset, wherein the environmental factors include characteristics of a customer associated with the specific asset, characteristics of the specific asset relative to the threat, and characteristics of a workload distribution relative to the threat;
   determining a contextual score for the specific asset based on at least one tag of the specific asset; and
   deriving a prioritization score for the specific asset, the prioritization score a combination of the vulnerability score, the threat score and the contextual score, the prioritization score representing a prioritizing, specific to the specific asset, of a context-dependent vulnerability of the specific asset to the threat.

2. The method of claim 1, further comprising:
   determining a remediation to apply to the specific asset, responsive to the prioritization score meeting a threshold.

3. The method of claim 1, wherein:
   the vulnerability score assesses vulnerability of the specific asset relative to threats in general and relative to a specific vulnerability;
   the threat score assesses vulnerability of the specific asset to the threat, relative to the specific vulnerability; and
   the contextual score assesses a workload context of the specific asset relative to static aspects of the specific asset, from at least one static tag, and relative to security events, from at least one dynamic tag.

4. The method of claim 1, wherein correlating the information about the threat with the information about the specific asset comprises determining one of:
   whether the threat has an impact on the specific asset, whether the threat is associated with the customer, whether the threat utilizes positioning of a workload associated with the specific asset to impact the specific asset, whether the specific asset has an operating system targeted by the threat, whether the specific asset has an application targeted by the threat, whether the specific asset has a vulnerability associated with a common vulnerabilities and exposures identifier (CVE ID) that is associated with the threat, or severity of impact the threat poses to the application.

5. The method of claim 1, wherein the contextual score is based on one of:
   whether the specific asset has sensitive data, whether the specific asset has a critical server, whether the specific asset is Web-connected, whether there is a virus found in the specific asset, whether there is a detected intrusion to the specific asset, whether there is suspect data transferred to the specific asset, or whether there is suspect data transferred from the specific asset.

6. The method of claim 1, wherein:
   the vulnerability score is on a first predetermined scale;
   the threat score is on a second predetermined scale;
   the contextual score is on a third predetermined scale; and
   the prioritization score is proportional to the product of the vulnerability score, the threat score and the contextual score.

7. The method of claim 1, wherein the vulnerability score is based on a common vulnerability scoring system (CVSS) score.

8. The method of claim 1, wherein correlating the information about the threat with the information about the specific asset is based on one of threat impact, operating system supported, application supported, or threat type.

9. A tangible, non-transitory, computer-readable media having instructions thereupon which, when executed by a processor, cause the processor to perform a method comprising:
   obtaining one of a base common vulnerability scoring system (CVSS) score or a temporal common vulnerability scoring system score, concerning a specific asset deployed by an organization in a specific virtual computing environment, wherein the specific asset is a virtual machine or a virtual application that is implemented using physical computing components in the specific virtual computing environment;
   receiving threat information;
   generating a threat score for the specific asset, based on applicability of the threat information to the specific asset relative to environmental factors of the specific asset, wherein the environmental factors include characteristics of a customer associated with the specific asset, characteristics of the specific asset relative to the threat, and characteristics of the workload distribution relative to the threat;
   generating a contextual score for the specific asset, based on information on at least one tag of the specific asset; and generating a prioritization score for the specific asset, based on a multiplication of the contextual score, the threat score and the one of the base common vulnerability scoring system score or the temporal common vulnerability scoring system score, the prioritization score representing a prioritizing, specific to the specific asset, of a context-dependent vulnerability of the specific asset to the threat.

10. The computer-readable media of claim 9, wherein the threat information indicates one of existence of a threat, a target operating system of the threat, a target application of the threat, information about an attack, a common vulnerabilities and exposures identifier (CVE ID), or a severity of the threat.

11. The computer-readable media of claim 9, wherein obtaining includes generating the one of the base common vulnerability scoring system score or the temporal common vulnerability scoring system score, or receiving from a scanner the one of the base common vulnerability scoring system score or the temporal common vulnerability scoring system score.

12. The computer-readable media of claim 9, wherein:
the contextual score is based on information on at least one static tag indicating one of:
whether the specific asset has sensitive data, whether the specific asset has a critical server, or whether the specific asset is Web-based; and
the contextual score is further based on information on at least one dynamic tag indicating one of: whether a virus is found on the specific asset, whether an intrusion to the specific asset is detected, whether suspect data is transferred to the specific asset, or whether suspect data is transferred from the specific asset.

13. The computer-readable media of claim 9, wherein the threat score is based on one of: impact a threat referenced in the threat information has on the specific asset, association between the threat and the customer, impact of positioning of workload associated with the specific asset on the threat, an operating system of the specific asset matching a target operating system of the threat, an application of the specific asset matching a target application of the threat, a common vulnerabilities and exposures identifier (CVE ID), or a severity of impact on the application posed by the threat.

14. The computer-readable media of claim 9, wherein:
the specific asset includes a virtual machine or a virtual application, based on physical computing resources;
the threat information is received from a source external to the specific asset; and
the threat score is based on a correlation of the threat information and information about the specific asset derived from the at least one tag of the specific asset.

15. A processor-based contextual vulnerabilities prioritization system for prioritizing vulnerabilities of a specific asset deployed by an organization in a specific virtual computing environment, comprising:
a vulnerability module that obtains a vulnerability score for the specific asset, based on a CVSS (common vulnerability scoring system) score or other base or temporal vulnerability score, wherein the specific asset is a virtual machine or a virtual application that is implemented using physical computing components in the specific virtual computing environment;
a threat module that generates a threat score assessing vulnerability of the specific asset to a threat, based on environmental factors of the specific asset relative to threat information and based on information about the specific asset from at least one tag of the specific asset, wherein the environmental factors include characteristics of a customer associated with the specific asset, characteristics of the specific asset relative to the threat, and characteristics of a workload distribution relative to the threat;
a contextual module that generates a contextual score based on workload context of the specific asset relative to static aspects of the specific asset from the at least one tag and dynamic aspects of the specific asset from the at least one tag;
a prioritization module that multiplies together the threat score, the contextual score and the vulnerability score to generate a prioritization score for the specific asset, the prioritization score representing a prioritizing, specific to the specific asset, of a context-dependent vulnerability of the specific asset to the threat; and
a processor coupled to the vulnerability module, the threat module, the contextual module and the prioritization module, which are implemented using the processor, hardware, or firmware, or combination thereof.

16. The system of claim 15, further comprising:
the vulnerability module configured to couple to an external source from which the vulnerability module obtains a base common vulnerability scoring system (CVSS) score or a temporal common vulnerability scoring system score, as the vulnerability score.

17. The system of claim 15, wherein:
the threat module is configured to couple to an external source from which the threat module receives the threat information;
the at least one tag includes information about at least one of an operating system of the specific asset, or an application of the specific asset; and
the threat module correlates the threat information and the information about the specific asset from the at least one tag.

18. The system of claim 15, wherein:
the contextual module is configured to couple to the at least one tag of the specific asset;
the at least one tag includes security tags, which have information about the dynamic aspects of the specific asset; and
the at least one tag includes static tags, which have information about the static aspects of the specific asset.

19. The system of claim 15, wherein each of the threat score, the vulnerability score, the contextual score, and the prioritization score is specific to the specific asset and specific to a vulnerability identified by a CVE ID (common vulnerabilities and exposures identifier).

20. The system of claim 15, wherein the threat module, in order to generate the threat score, correlates one of: a customer targeted by the threat, positioning of a workload associated with the specific asset relative to the threat, an operating system targeted by the threat, and an operating system of the specific asset, an application targeted by the threat, and an application of the specific asset, or an impact the threat poses on the application, and a severity of the impact.

* * * * *